United States Patent
Weber et al.

(10) Patent No.: US 7,734,601 B2
(45) Date of Patent: Jun. 8, 2010

(54) INTEGRATION OF DIGITAL ASSET MANAGEMENT WITH INTELLECTUAL PROPERTY MANAGEMENT

(75) Inventors: Jutta Weber, Mannheim (DE); Martin Alt, Kaiserslautern (DE); Ralf Freyler, Zweibruecken (DE)

(73) Assignee: SAP AG, Walldorf (DE)

( * ) Notice: Subject to any disclaimer, the term of this patent is extended or adjusted under 35 U.S.C. 154(b) by 817 days.

(21) Appl. No.: 11/261,784

(22) Filed: Oct. 31, 2005

(65) Prior Publication Data
US 2006/0218148 A1   Sep. 28, 2006

(51) Int. Cl.
G06F 21/24   (2006.01)
(52) U.S. Cl. .................. 707/695; 707/787; 707/793; 707/797; 707/913; 707/923; 707/948
(58) Field of Classification Search .............. None
See application file for complete search history.

(56) References Cited

U.S. PATENT DOCUMENTS

| | | | |
|---|---|---|---|
| 5,313,630 A * | 5/1994 | Namioka et al. | 707/103 R |
| 5,729,744 A * | 3/1998 | Gerken et al. | 707/203 |
| 5,842,023 A * | 11/1998 | Tsumura | 717/170 |
| 6,018,741 A * | 1/2000 | Howland et al. | 707/102 |
| 6,405,215 B1 | 6/2002 | Yaung | |
| 6,519,571 B1 | 2/2003 | Guheen et al. | |
| 6,947,959 B1 | 9/2005 | Gill | |
| 7,039,655 B2 | 5/2006 | Kapczynski et al. | |
| 7,099,849 B1 * | 8/2006 | Reeder et al. | 705/59 |
| 7,146,325 B2 | 12/2006 | Yamakawa et al. | |
| 7,149,734 B2 | 12/2006 | Carlson et al. | |
| 7,197,466 B1 | 3/2007 | Peterson et al. | |
| 7,212,574 B2 * | 5/2007 | Abrams et al. | 375/240.25 |
| 7,213,005 B2 | 5/2007 | Mourad et | |
| 7,246,086 B2 | 7/2007 | Araki et al. | |
| 7,249,057 B2 | 7/2007 | Hatakama et al. | |
| 7,266,516 B2 | 9/2007 | Song et al. | |
| 7,266,704 B2 * | 9/2007 | Levy | 713/193 |
| 7,398,392 B2 * | 7/2008 | Weber | 713/168 |
| 2002/0019778 A1 | 2/2002 | Isaacson et al. | |
| 2002/0033844 A1 * | 3/2002 | Levy et al. | 345/744 |
| 2002/0042749 A1 | 4/2002 | Yugami et al. | |
| 2002/0082997 A1 | 6/2002 | Kobata et al. | |
| 2002/0103707 A1 | 8/2002 | Takeuchi et al. | |
| 2002/0143976 A1 | 10/2002 | Barker et al. | |
| 2002/0165832 A1 | 11/2002 | Kawaguchi et al. | |
| 2002/0186844 A1 * | 12/2002 | Levy et al. | 380/231 |
| 2002/0194081 A1 | 12/2002 | Perkowski et al. | |

(Continued)

OTHER PUBLICATIONS

Cardonet "Cardonet Expands Product Information Management Solution with Introduction of Cardonet Synergy™ Software", Press Release, May 25, 2004.*

(Continued)

*Primary Examiner*—Luke S Wassum
(74) *Attorney, Agent, or Firm*—Kenyon & Kenyon LLP

(57) ABSTRACT

The disclosure relates to a digital asset storage, search and retrieval system. Each digital asset may comprise one or more versions and properties. The system may access stored digital assets using hierarchical classifications under a taxonomy based on the properties. The digital assets may be assigned conditions governing usage of the assets. Via relationship networks, the digital assets may "inherit" the conditions from other digital assets.

16 Claims, 13 Drawing Sheets

U.S. PATENT DOCUMENTS

| | | | |
|---|---|---|---|
| 2002/0198791 A1 | 12/2002 | Perkowski et al. | |
| 2003/0009392 A1 | 1/2003 | Perkowski et al. | |
| 2003/0051066 A1 | 3/2003 | Pace et al. | |
| 2003/0110126 A1* | 6/2003 | Dunkeld et al. | 705/39 |
| 2003/0140034 A1 | 7/2003 | Probst et al. | |
| 2003/0208638 A1* | 11/2003 | Abrams et al. | 709/328 |
| 2003/0213844 A1 | 11/2003 | Yoshida et al. | |
| 2004/0015408 A1* | 1/2004 | Rauen et al. | 705/26 |
| 2004/0024652 A1* | 2/2004 | Buhse et al. | 705/26 |
| 2004/0044730 A1 | 3/2004 | Gockel et al. | |
| 2004/0088328 A1 | 5/2004 | Cook et al. | |
| 2004/0112236 A1 | 6/2004 | Yokoyama et al. | |
| 2004/0117377 A1 | 6/2004 | Moser et al. | |
| 2004/0139001 A1 | 7/2004 | Henriques et al. | |
| 2004/0176080 A1 | 9/2004 | Chakravorty et al. | |
| 2004/0181426 A1 | 9/2004 | Rose | |
| 2004/0181548 A1 | 9/2004 | Thomas et al. | |
| 2004/0187111 A1 | 9/2004 | Eakin | |
| 2004/0193508 A1 | 9/2004 | Takano et al. | |
| 2004/0210468 A1 | 10/2004 | Rubel et al. | |
| 2004/0210479 A1 | 10/2004 | Perkowski et al. | |
| 2005/0004838 A1 | 1/2005 | Perkowski et al. | |
| 2005/0010475 A1 | 1/2005 | Perkowski et al. | |
| 2005/0028008 A1 | 2/2005 | Kumar | |
| 2005/0038707 A1 | 2/2005 | Roever et al. | |
| 2005/0091270 A1 | 4/2005 | Beilinson et al. | |
| 2005/0096011 A1 | 5/2005 | Yoshida et al. | |
| 2005/0155000 A1 | 7/2005 | Weiler et al. | |
| 2005/0197852 A1 | 9/2005 | Gebhard et al. | |
| 2005/0246193 A1* | 11/2005 | Roever et al. | 705/1 |
| 2005/0251456 A1 | 11/2005 | Perkowski et al. | |
| 2005/0262243 A1* | 11/2005 | Ternasky et al. | 709/225 |
| 2006/0005237 A1* | 1/2006 | Kobata et al. | 726/12 |
| 2006/0011716 A1 | 1/2006 | Perkowski et al. | |
| 2006/0046242 A1 | 3/2006 | Takano et al. | |
| 2006/0161604 A1* | 7/2006 | Lobo | 707/203 |
| 2006/0179076 A1 | 8/2006 | Weber et al. | |
| 2006/0253436 A1 | 11/2006 | Cook et al. | |
| 2006/0265337 A1 | 11/2006 | Wesinger | |
| 2007/0033154 A1* | 2/2007 | Trainum et al. | 707/1 |
| 2007/0050409 A1* | 3/2007 | Bugir et al. | 707/104.1 |
| 2007/0067427 A1* | 3/2007 | Bugir et al. | 709/223 |
| 2007/0073626 A1* | 3/2007 | Reeder et al. | 705/59 |
| 2007/0113184 A1 | 5/2007 | Haot et al. | |
| 2007/0162416 A1 | 7/2007 | Morsch et al. | |
| 2007/0208720 A1 | 9/2007 | Probst et al. | |
| 2007/0226068 A1 | 9/2007 | Keil et al. | |
| 2007/0294173 A1* | 12/2007 | Levy et al. | 705/51 |
| 2008/0133259 A1 | 6/2008 | O'Connor et al. | |
| 2008/0140433 A1* | 6/2008 | Levy et al. | 705/1 |
| 2008/0215509 A1* | 9/2008 | Charlton | 706/11 |

OTHER PUBLICATIONS

Cardonet "Cardonet Synergy: The Optimal Combination of Power and Flexibility", downloaded from cardonet.com, Jun. 5, 2004.*

"Microsoft Visual Sourcesafe Best Practices", Microsoft Corporation, created Mar. 1999 and updated Dec. 2000, retrieved on Mar. 23, 2009 from http://msdn.microsoft.com/en-us/library/bb5O9342(VS.8O).aspx.

Artesia, Inc, Teams 4.4 website product information Teams 4.4 product information page, from http:www.artesia.com website as of Oct. 4, 2002 from Internet Wayback Machine http://web.archive.org/web/20021004111309/www.artesia.com/teams_44.html.

Meserve, Jason, "Artesia adds workflow to digital asset management tool", Sep. 10, 2002 Network Fusion (www.nwfusion.com) from Internet Wayback Machine http://web.archive.org/web/20030803003231/www.nwfusion.com/ news/2002/0910art.html.

Kalin, Sari, "Putting Context in Context", Jul. 15, 2002 CIO Magazine (www.cio.com) from Internet Wayback Machine http://web.archive.org/web/20041205033454/www.cio.com/archive/071502/et_article.html.

Patz, Joel T, "Project 2000 gets your team working", PC World, Feb. 2000, vol. 18, iss 2, p. 18 retrieved from search in Pro Quest Direct.

Whitney, Daisy, "Discovery system aids repurposing" Electonic Media (www.emonline.com) Aug. 19, 2002, pub by Crain Communications from Internet Wayback Machine http://web.archive.org/web/20021003140451/www.emonline.com/ technology/081902discovery.html.

Harkins, Susan Sales; Foust, Charlotte, "Preventing and recovering from database bloat", Inside Microsoft Access, Jul 2003, vol. 11 ,Iss 7, p. 9 from Proquest document search http://proquest.umi.com/pqdweb? index=10&did=355244011 & SrchMode=1&sid=8 &Fmt=6&VInst=PROD&VType=PQD&RQT=309&VName=PQD &Ts=1188568334&clientld=19649.

Chris Ward, Time savers :[Final 1 Edition]. The Times, Aug. 23, 2003, p. 24. Retrieved from ProQuest Newsstand database.

O'Leary, J. "UCCnet Synchronization: Managing the Integration Imperatives", Common.Connect, Jun. 2004, pp. 21-25.

Parks, L. "Standardized Data on the Cheap: J.R. Wood Synchronizes Data Just Like the Big Guys", Stores, National Retail Federation, www.stores.org, Jul. 2004.

Saqqara "Alcoa Chooses Saqqara's Managed Service to Meet Cost Savings Objectives", Press Release, May 3, 2004.

Saqqara "Item Master Management", downloaded from www.saqqara.com, Jan. 14, 2009.

Cardonet "Cardonet Rolls Out New Suite of Product Information Management Solutions" , Press Release, Dec. 10, 2002.

Cardonet "Cardonet Product MasterTM DE Distributor Edition", downloaded from cardonet.com, Jun. 9, 2003.

Cardonet "A Complete Solution for Product Information Management & Data Synchronization", downloaded from cardonet.com, Oct. 8, 2003.

Rugullies, E. "Product Information Management Leaders Emerge", White Paper 34941, Forrester Research, Inc., Dec. 6, 2004.

SAP AG "Master Data Management for the Media Industry", White Paper 50-087-438, Dec. 2007.

* cited by examiner

200

Shopping Cart

All assets that you have previously selected for download will appear in this shopping cart. If you have completed your selection, You may choose to convert your files to a specific format, or download the assets in their original format.

Number of assets in your shopping cart: 2

Text 2

| Select Assets on page | Deselect All | Convert Assets | MimeType Filter | all extensions ▼ |

602　603　604

☐ [image] 100-0003_IMG.JPG (100-0003_IMG.JPG)
MimeType: image/jpeg  [Convert]
Name: 100-0003_IMG.JPG Doc Type: Animals Size(MB): 0.521 Created by: DAMADMIN Created: Tue Jul 13 15:26:18 CEST 2004 Doc. Status: Effective Sec. Status: Public Modified: Tue Jul 13 15:31:16 CEST 2004 Modified by: DAMADMIN Brand: COTTONELLE  [Remove] — 605

☐ [image] 100-0026_IMG.JPG (100-0026_IMG.JPG)
MimeType: image/jpeg  [Convert]
Name: 100-0026_IMG.JPG Doc Type: KC Backgrounds Size(MB): 0.403 Created by: FUHRMANN Created: Tue Mar 02 11:26:02 CET 2004 Doc. Status: Effective Sec. Status: Public Modified: Mon Sep 27 09:45:00 CEST 2004 Modified by: SCHLOSSERR region: LAO Brand: ANDREX;DEPEND;CR CLASSIC;BLOCK-IT Sector: Corporate

601

You also have a ways of getting your files. The standard download option will save items to your desktop. Other Download Options will allow you to save conversions and download within the next 48 hours, or use our Mass Transit system to download several large files to your desktop. CD/DVD allows you to make any conversions needed, and we will burn a CD and ship it to you. Please allow several days for a standard UPS delivery if you choose the CD/DVD option.

Download Shopping Cart

[Download] [Other Download Options] [Order CD/DVD]

| NETWORK_ID | NETWORK_ITEM | CREATED_AT | .... |
|---|---|---|---|
| 4711 | ASSET A | 12.12..... | |
| 4711 | ASSET B | 12.12..... | |
| 4711 | ASSET C | 12.12..... | |
| 4711 | ASSET D | 12.12..... | |
| 5812 | ASSET V | 01.01..... | |
| 5812 | ASSET W | 01.01..... | |
| 5812 | ASSET X | 01.01..... | |
| 5812 | ASSET Y | 01.01..... | |
| 5812 | ASSET Z | 01.01..... | |

BEFORE FUSION

1202

| NETWORK_ID | NETWORK_ITEM | CREATED_AT | .... |
|---|---|---|---|
| 8877 | ASSET A | 12.12..... | |
| 8877 | ASSET B | 12.12..... | |
| 8877 | ASSET C | 12.12..... | |
| 8877 | ASSET D | 12.12..... | |
| 8877 | ASSET V | 01.01..... | |
| 8877 | ASSET W | 01.01..... | |
| 8877 | ASSET X | 01.01..... | |
| 8877 | ASSET Y | 01.01..... | |
| 8877 | ASSET Z | 01.01..... | |

AFTER FUSION

FIG. 12 ively exhibit the behavior that characterizes an object and
INTEGRATION OF DIGITAL ASSET MANAGEMENT WITH INTELLECTUAL PROPERTY MANAGEMENT This application claims the benefit under 35 USC 119(e) of U.S. provisional application 60/650,955, filed Feb. 9, 2005 and fully incorporated herein by reference.

BACKGROUND OF THE INVENTION

A "digital asset" is a data object that carries marketable information content. Thus, the term covers various multimedia files, including image files, audio files (e.g., music), audio-video files and the like. The term also may cover text files or data files, such as product reports, analyses, recommendations, etc.

Digital asset management systems, as their name implies, are computer systems that permit asset owners to manage their assets. For example, a digital asset management system may permit consumer product manufacturers (who manufacture an array of products) to manage their retailers' or advertisers' use of product images throughout advertisements and other commercial notices regarding the products themselves.

In known digital asset management systems, consumers' user experiences in browsing through and retrieving digital assets may be awkward and non-intuitive. Therefore, there is a need in the art for a digital asset management system that is easy to use.

There is further a need for protection of the intellectual property that digital assets represent. Digital assets may, for example, be sold among various participants in a market. The assets typically are sold in contracts that limit ways in which a purchasing party may use the digital asset. The rights associated with the aspect of digital assets as property must be protected, and the agreements that govern such rights need to be administered and observed.

BRIEF DESCRIPTION OF THE DRAWINGS

FIGS. 3-6 show examples of screen displays according to embodiments of the present invention;

FIGS. 11 and 12 show an example of fusing digital asset relationship networks according to embodiments of the present invention.

DETAILED DESCRIPTION

Embodiments of the present invention provide methods and systems for digital asset management that address the above-described needs. Embodiments of the present invention comprise a digital asset storage, search and retrieval system. In the system, a number of advantageous user-friendly features provide for ease of use.

Embodiments of the present invention further relate to an automated system and method for managing intellectual property rights in the digital assets. The system may comprise a plurality of relationship networks between digital assets. The digital assets may be assigned conditions governing usage of the assets. The conditions may include legal rights to and/or restrictions on use of the assets. Access control, such as preventing the unauthorized viewing or downloading an asset, may be performed based at least in part on the conditions. Via the relationship networks, the digital assets may "inherit" conditions from other digital assets.

The discussion begins with a description of a digital asset management system according to embodiments of the invention, and then moves to a description of an associated intellectual property management system according to embodiments of the invention.

The digital asset management system described herein may include objects and use object-oriented methods. As is known, a software object may include data and an interface through which other objects can read, change or add to the data. Linkages may be formed between objects. Though it is typically transparent to the object-oriented programmer, in embodiments objects may be implemented at least in part as tables comprising a plurality of modifiable entries that collectively exhibit the behavior that characterizes an object and that can logically link objects. For example, digital assets or digital asset versions of the digital asset management system may be objects that may be linked with other objects, such as business objects representing products.

Digital Asset Management System

Figure 1:
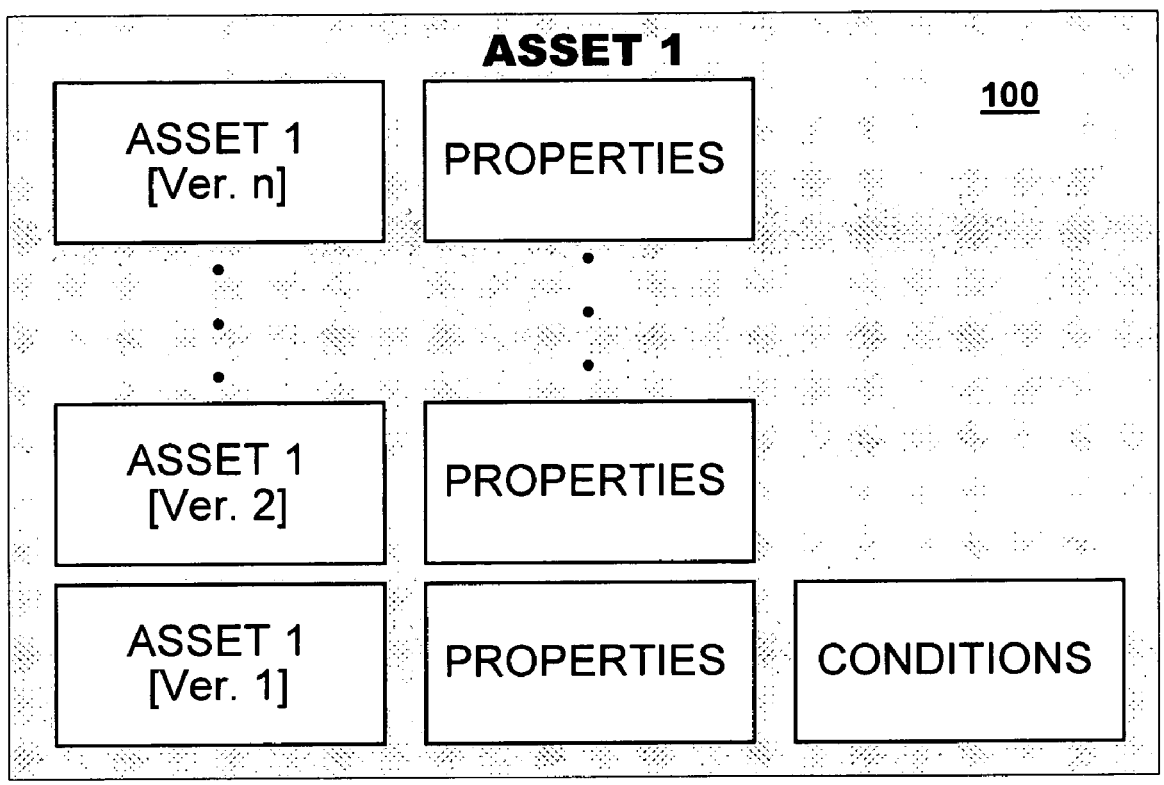
FIG. 1 shows a data structure for a digital asset according to embodiments of the present invention.

FIG. 1 shows a data structure for a digital asset 100 according to embodiments of the invention. A digital asset 100 may include multiple parts. The parts may include files of all kinds. The files may include, for example, one or more media objects, such as a picture, movie, song, data or the like. The digital asset may contain multiple versions of the files, including a latest or active version, and all previous versions.

The digital asset 100 may further include properties. The properties may be used to classify the digital asset. The properties may apply to specific versions and be different for different versions. For example, the properties may identify which of the versions of a digital asset is the active version. Properties may also apply to the digital asset 100 as a whole and not to a specific version.

A digital asset and its versions may be viewed as a "logical information object" (LOIO) and "physical information objects" (PHIOs), respectively. A digital asset as a LOIO may be thought of as representing a general concept or category—say, "Advertisement for a diaper." A succession of versions of the digital asset represent various actual realizations of a diaper advertisement, or PHIOs. It should be understood that, as used herein, "digital asset," unless distinguished from a version, generally means a version of a digital asset, i.e., a PHIO.

As noted, the properties may identify which of possibly many versions is active (i.e., valid or currently in effect). Only one version can be active at a time. When a new version is added to the digital asset, it need not be identified as active. For example, it can be a work in progress not yet ready for release to other parties. When a new version is identified as active, however, a formerly active version will be designated not active. The digital asset management system may review these activeness designations within a properties field to determine which media object to release to external parties.

The digital asset 100 may further include conditions on its use. Among other things, conditions may be inherited—propagated among related digital assets. This ensures data integrity and ensures that valid conditions are assigned to all affected digital assets. Conditions are discussed in more detail further on.

Figure 2:
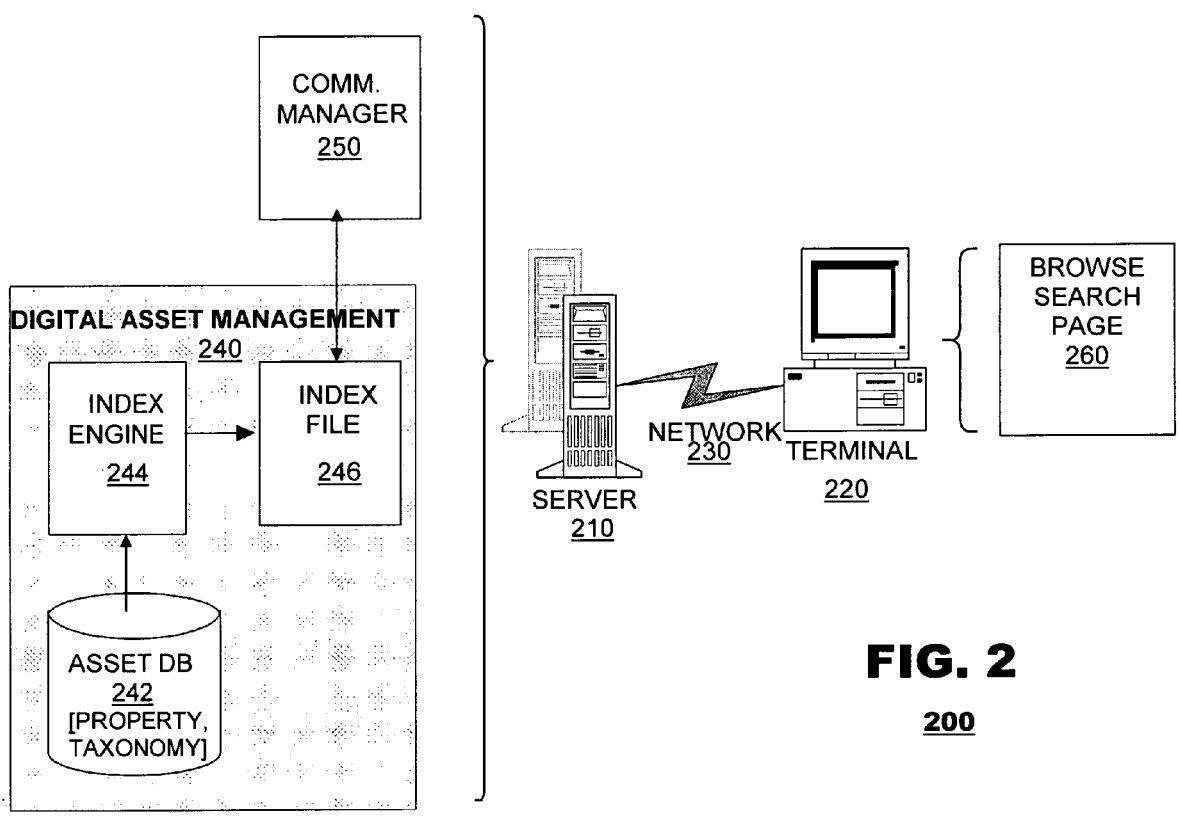
FIG. 2 shows a system to implement embodiments of the present invention.

FIG. 2 illustrates a system 200 according to embodiments of the invention. The system 200 may comprise a server 210 and a terminal 220, connectable to the server 210 by a communication network 230. The network may include, for example, the Internet or World Wide Web, but could also include any wide area network (WAN) or local area network (LAN). The server 210 may include a processor and a memory coupled to the processor. The server 210 may further include storage media storing computer-executable instructions to implement a digital asset management application 240 and a communication manager 250. The server 210 may execute the digital asset management application 240 and the communication manager 250. The communication manager 250 may manage communication with the terminal 220. In particular, the communication manager may send web pages, such as a browse search page 260, interactively generated by the digital asset management application 240, via the network 230 to a client at the terminal 220.

The digital asset management application 240 may further comprise a database 242 storing digital assets. An index engine 244 of the digital asset management application 240 may access digital assets in the database 242 to form an index file 246. The index file 246 may be used, among other things, for responding to user requests by generating web pages for sending to the user. Specifically, the digital asset management application 240 may receive user requests entered by a user at a terminal 220, and execute the index engine 244 to access the asset database 242 to respond to the requests. The requests may be, in particular, search parameters entered in a browse session in order to locate a desired digital asset. Based on the search parameters entered, the user may be caused to navigate through a series of displays.

Tree structures associated with the digital assets may determine a navigation path through the displays. As is well known, a tree structure in software terms may define a hierarchy of nodes, including "root" or "parent" nodes and various levels of "child" nodes. In embodiments of the present invention, the tree structures or hierarchies may be used to implement a taxonomy or classification system under which assets are organized and classified based on their properties. The hierarchies may be built, for example, by a system administrator or other system operator who uses a GUI (graphical user interface) to define classes and related subclasses. A given asset, depending on its properties, could belong to more than one hierarchy.

Figure 3:
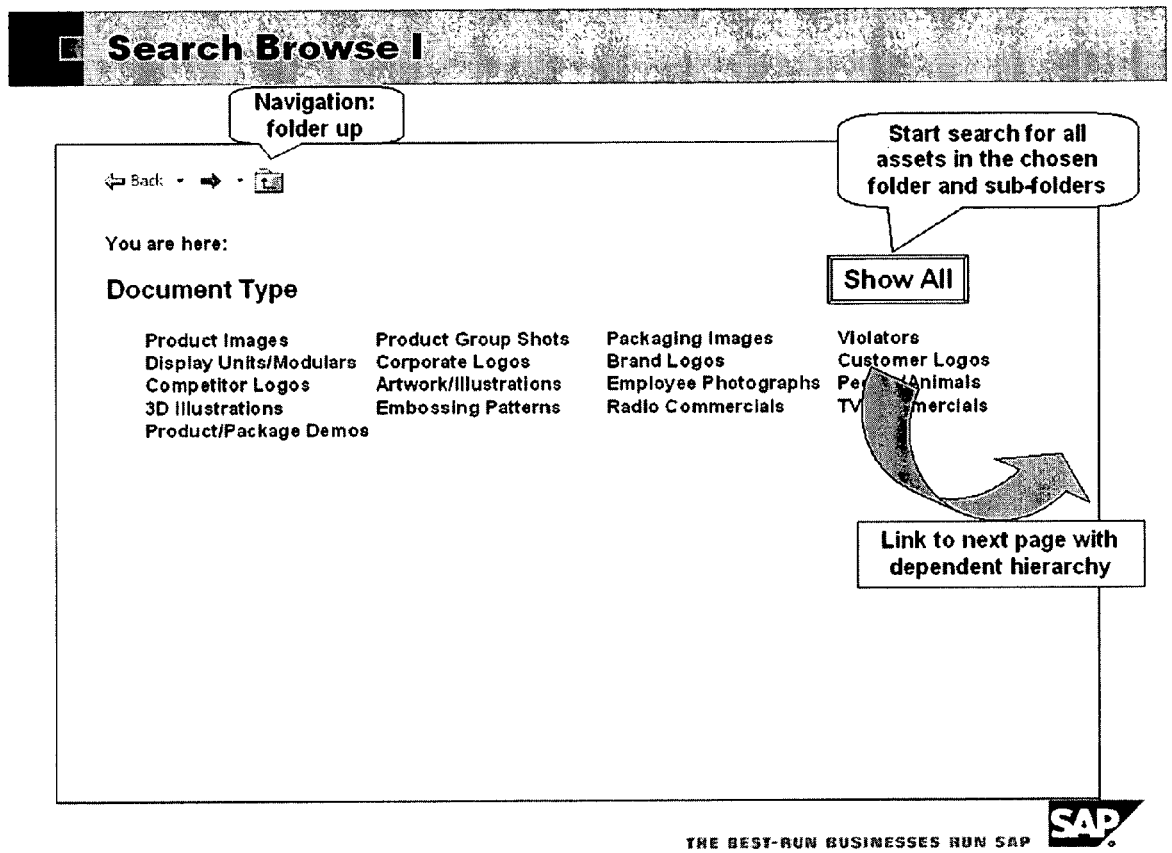

An example follows. The above-described components provide a number of capabilities and user-friendly features. Among these is a browse search capability. Browse search functionality according to embodiments of the present invention may use the hierarchical tree structures and their classifications to efficiently perform a search and present its results. FIG. 3 shows an example of a screen display that could be presented to a user, based on search parameters entered by the user. For example, a user might indicate that he wants to search for a digital asset. Possibly after one or more preceding displays (such as a log-on screen), the display of FIG. 3 may be presented to the user. The display shows a list of asset (document) types. Each list item (e.g., "Product Images" or "Customer logos") may represent a root node in a hierarchical tree structure.

Figure 4:
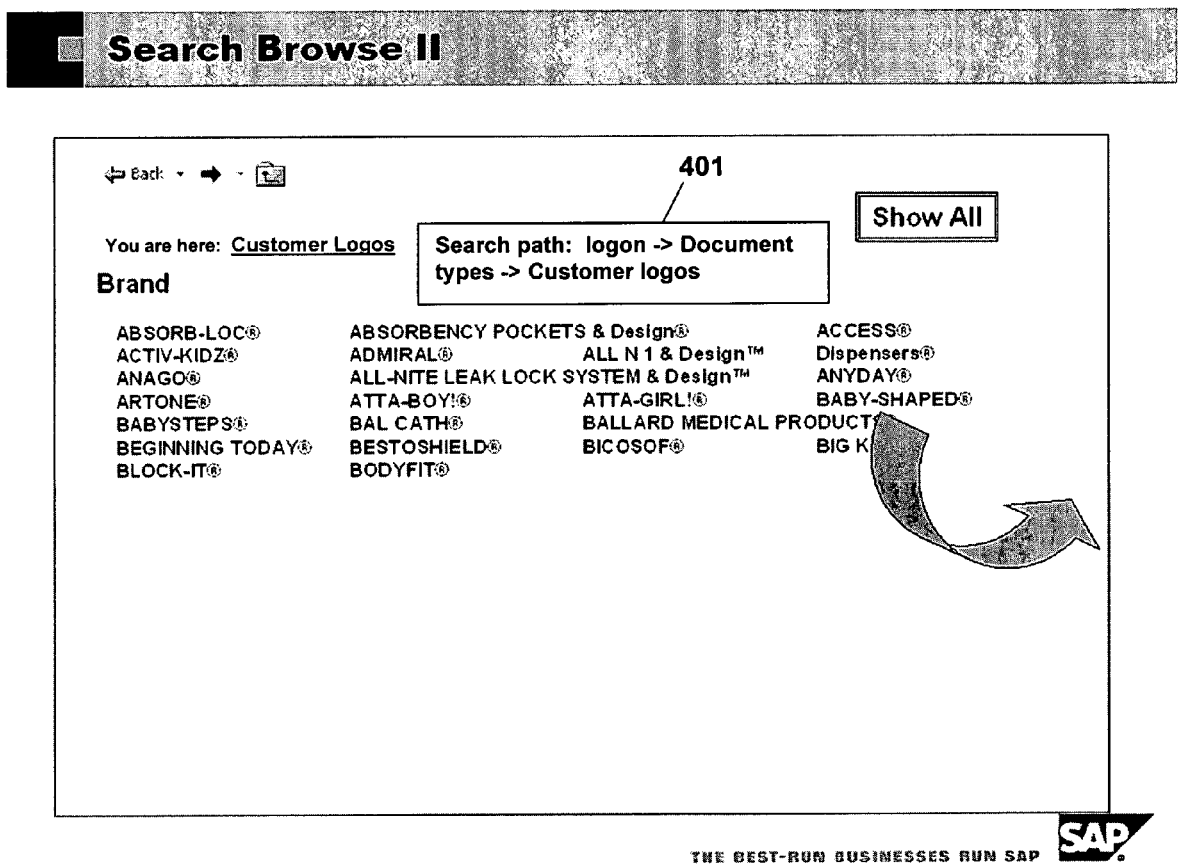

Each root node in the hierarchy may have child nodes representing a further refinement of the classification assigned to the root node. By selecting a node (e.g. by "clicking" on the corresponding field or otherwise querying or activating a node), a user may see a display of the next-lower level in the hierarchy. FIG. 4, for example, shows a display that a user might see by selecting the "Customer Logos" field and clicking on "Show All". A list of specific customer logos is presented. Again, each specific customer logo may represent a node, classified according to a taxonomy, in a hierarchy. A user may be able to navigate upward or downward (or, backward or forward from another perspective) in the hierarchy. Moreover, a display could show more than one level of a hierarchy. For example, a display could show both child nodes and grandchild nodes of a higher-level node.

In an advantageous feature according to embodiments of the invention, a search or navigation path report 401, which indicates the path taken through a given hierarchy up to the current screen display, may be provided. The example of FIG. 4 is rather simple but it is illustrative. In actual practice navigation paths could be considerably more complex. This feature provides for a more convenient user experience because it can help the user recall how to reach a desired asset in the future, or assist the user in searching for similar assets.

When the browser is invoked, the digital asset management application 240 may determine which nodes of the hierarchy point to stored assets. "Empty" nodes, i.e., nodes to which some classification is assigned but which do not currently point to actual stored assets are not displayed. Also, nodes which contain only assets the user is not authorized to see are not displayed.

Figure 5:
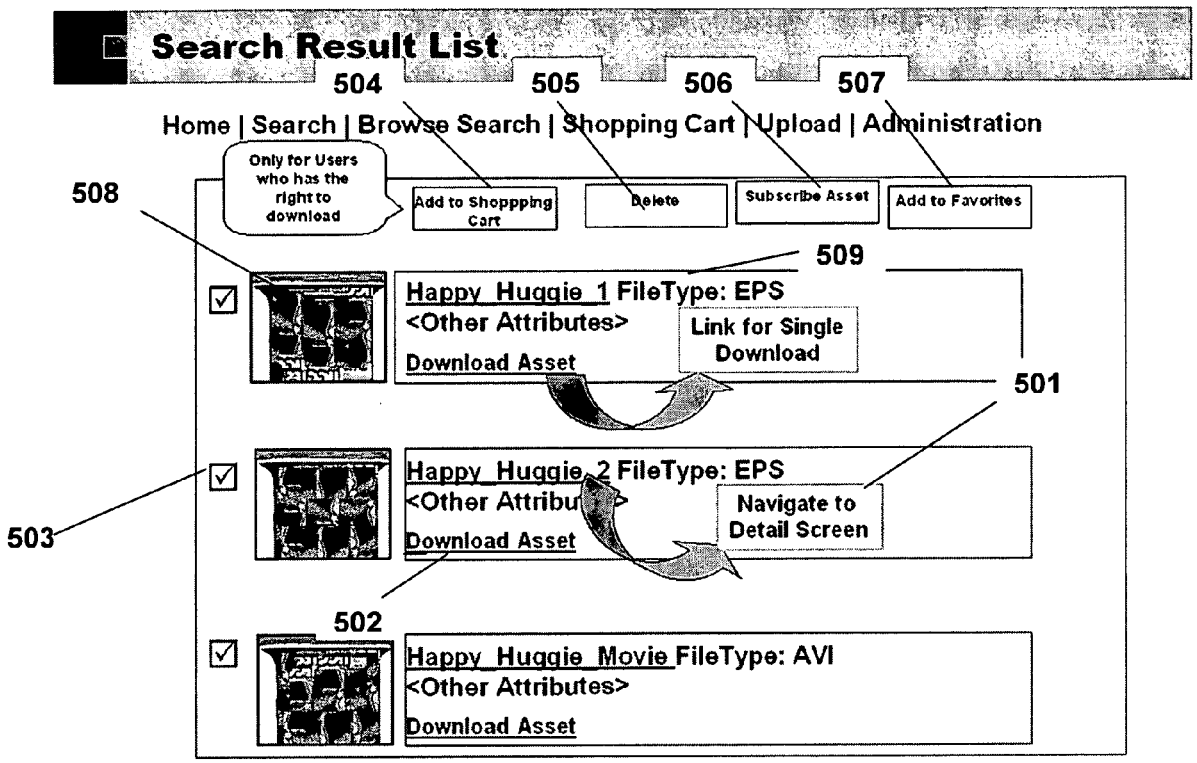

By selecting an item, say, "BABY-SHAPED®", in the list of customer logos, a user may see the next-lower level in the hierarchy, as shown in FIG. 5. In this example, FIG. 5 represents a "results list" where nodes in the hierarchy correspond directly to stored digital assets.

As noted earlier, the same digital asset may belong to multiple different hierarchies, depending upon whether its properties fit to a given set of classifications of a hierarchy. However, the path to the digital asset may be different for each hierarchy. For example, one or more of the digital assets shown in FIG. 5 might have also been reached if the user had selected "Product Images" instead of "Customer Logos" as the root node. However, the path may have included a different series of nodes and corresponding displays, because of the way the nodes of the "Product Images" hierarchy were classified when this hierarchy was built. Thus, according to embodiments of the present invention, among other properties of a digital asset there may be a plurality of "path" properties. Each path property may identify all the levels of a given hierarchy that must be navigated in order to reach a results list.

Returning now to FIG. 5, a number of operations may be possible with a results list. For example, a user may be able to navigate to a detail view of a listed asset by clicking on a field such as box 501, download an asset on the list by clicking a field such as box 502, mark assets via a checkbox 503, add an asset or assets to a "shopping cart" (box 504), delete an asset (box 505), subscribe to an asset (box 506) (a subscriber may receive notification, via email e.g., when an asset changes) or add an asset to a "favorites" list (box 507). An asset may include a thumbnail picture 508 and a property, such as a file type 509.

FIG. 6 shows an example of a shopping cart. A shopping cart in this context is a data container for selected assets. Shopping cart entries may include an asset report 601 that comprises such information about an asset as a file name and type, a creator of the asset and a create time, a version status (e.g. latest or active), a security status (e.g., access to the asset is public), a last-modified time, an identifier of the modifier, and the like.

Options further provided from the shopping cart may include selecting or de-selecting assets (boxes 602 and 603), converting an asset to a different file type (box 604), removing an asset from the shopping cart (box 605), and downloading selected assets (box 606). When an asset is downloaded, the asset report 601 may be downloaded along with the asset. The asset report 601 may further include hyperlinks (not shown) to downloaded assets. Additionally, the asset report is fully customizable via XSLT Style Sheets.

The above-described system may provide for mass upload/download of assets, or for upload/download of a single asset.

In another feature, a user can opt to assign a new filename to an exported asset. In typical scenarios, the user would select a product name or a document type as the new filename.

Intellectual Property Management System

As noted previously, embodiments of the present invention may further relate to an automated system and method for managing intellectual property rights in the digital assets. This intellectual property management system may, for example, be implemented as a subset of the computer-executable instructions that implement the digital asset management application 240. Alternatively, the intellectual property management system may be a distinct and separate system integrated with the digital asset management application 240. The intellectual property management system may enable the assigning of conditions to a digital asset. The conditions may include legal rights to and/or restrictions on use of the digital asset. The digital asset may have attributes indicating whether a condition is assigned, and whether the condition is currently valid. When an operation such as viewing or download is attempted, access control may be performed to check these attributes and determine whether the operation is valid.

In embodiments of the invention, a text file (e.g., a .doc, .rtf, .pdf, .txt or .xls file) specifying rights to/restrictions on use of a digital asset may be assigned to the digital asset. The assignment, for example, may cause the text file to be carried along with the digital asset when the digital asset is called up during a browse session, or downloaded, for the user to read so that the user can understand the legal rights/restrictions associated with the digital asset. An example of such textual legal information follows:

"The rights granted for this digital asset are strictly limited to those listed below. If you have any questions concerning the use of this digital asset or the scope of the restrictions, please contact us! By downloading and using a digital asset with restrictions, you are responsible for observing the restrictions listed."

The above language might be followed by a list of restrictions. This textual information will be referred to hereafter as a "legal information document."

As noted above, access control may be performed based at least in part on the conditions. For example, rights/restrictions of a condition assigned to a digital asset might be effective only between particular time periods. The access control may check whether a digital asset has rights/restrictions assigned, and whether the rights/restrictions are valid based on the assigned time period. For example, if a user that previously had permission to use a digital asset tried to download the digital asset after an allowed date, the access control might prevent the digital asset from being downloaded. Further, the access control might operate preemptively, by omitting options that might otherwise be available. For example, if a given user is not authorized to perform a particular action, such as download after a specified date, a corresponding action key may be omitted from a display of the digital asset management system described above, while for an authorized user the action key would be shown.

Figure 7:
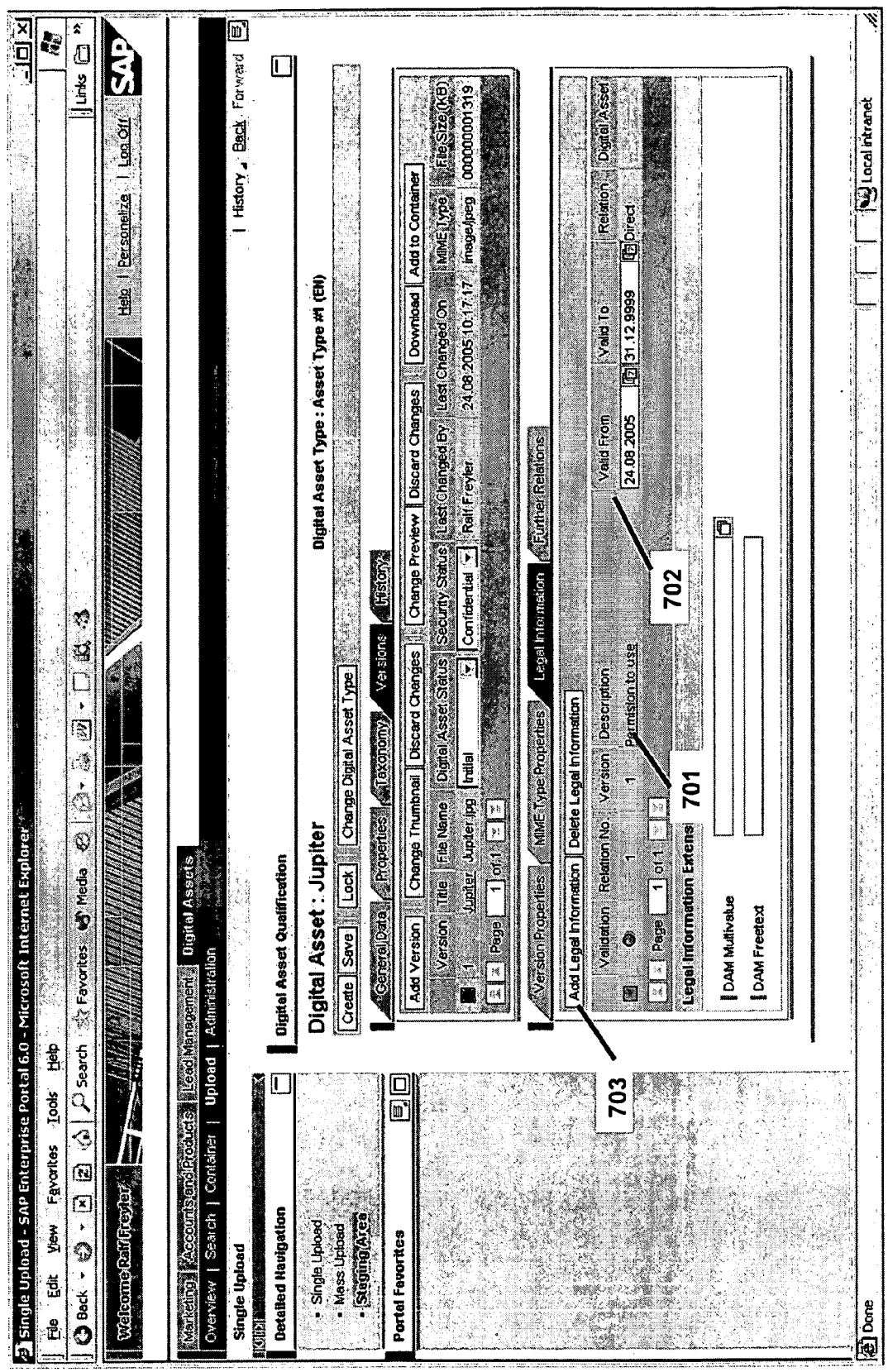
FIG. 7 shows an example of a screen display for assigning conditions to a digital asset according to embodiments of the present invention.

Conditions may be assigned to an asset as part of a process called "asset qualification." Asset qualification may be implemented as a central application of the digital asset management system to specify various features and characteristics of a digital asset. Among other things, asset qualification may be used to assign a condition to a digital asset. FIG. 7 shows one example of a display screen of a GUI that could be used to assign conditions to an asset. Using such a screen, a user could, for example, select a type of condition 701 ("condition" corresponds to "legal information" in FIG. 7) to be added to a digital asset, such as the right "Permission to Use." The user could further define a time period, such as a date range 702, during which the right is valid. The date range is an example of a restriction which may be enforced by access control. Then, by clicking on an action button such as "Add Legal Information" 703, functionality could be invoked to assign the condition to a selected digital asset (in this example, the digital asset "Jupiter"). This operation may create a relationship between a digital asset and a legal information document that states the rights/restrictions of the assigned condition in text.

The existence of a relationship between a digital asset and a legal information document (a "legal information relationship") may activate inheritance of the assigned condition by a related digital asset. The inheritance may be accomplished by way of an inheritance relationship. An inheritance relationship is a relationship between a higher-level digital asset and a lower-level digital asset. The inheritance relationship runs from the higher-level digital asset to the lower-level digital asset and may cause the automatic transfer of a condition assigned to the higher-level digital asset to the lower-level digital asset.

According to embodiments, the legal information document and access control may be implemented in an object. More particularly, there may exist legal information versions, similar to digital asset versions, and a legal information version may be an object. In this context, "object" means data and an interface comprising functionality via which the object can interact with other objects. A legal information version object may perform access control by determining what operations are valid for a digital asset with which it has a legal information relationship. For example, if a download is attempted for a given digital asset, a legal information version object may retrieve condition data (rights/restrictions) associated with the related digital asset to determine whether the download is authorized or not. If the download is being attempted outside of a defined date range, for example, the legal information version object may perform access control to prevent the download.

Figure 8:
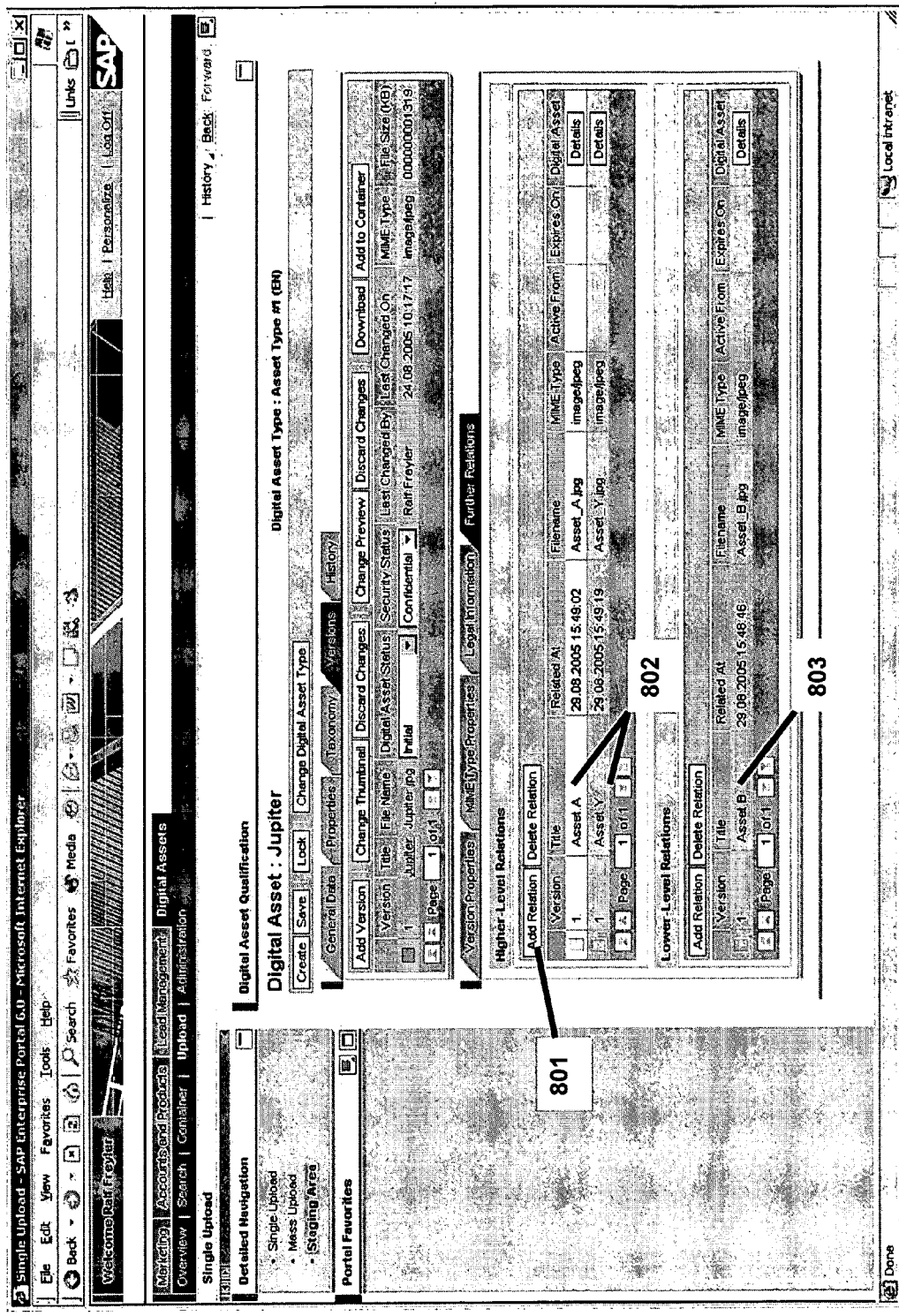
FIG. 8 shows an example of a screen display for creating a digital asset-to-digital asset relationship according to embodiments of the present invention.

The relationships described above may be maintained in the digital asset management system/intellectual property management system by way of linkages. The linkages may be manually created, for example by way of a user interface. FIG. 8 shows one example of a screen display of a graphical user interface (GUI) that might be used to manually create linkages to establish the above-described relationships. In the example shown, an "Add Relation" action button 801 may invoke functionality to create inheritance relationships via linkages between higher-level digital assets 802, Asset A and Asset Y, and lower-level digital asset 803, Asset B. Based on the inheritance relationships, a legal information version object assigned to Asset A or Asset Y would automatically also be assigned to Asset B. Thus, the legal information version object would provide the same legal information document and the same access control to Asset B that it provides to Asset A or Asset Y.

Figure 9:
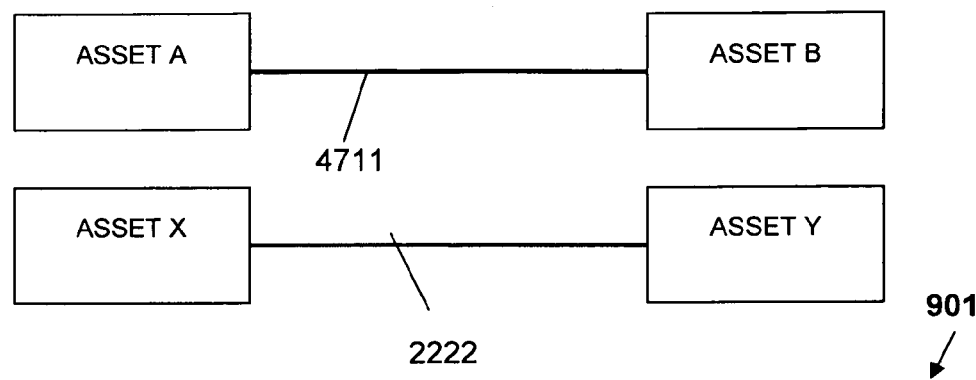
FIG. 9 shows digital asset relationship linkages and a network definition table according to embodiments of the present invention.

Collectively, the digital assets and the linkages between them may form a plurality of networks. The linkages may, for example, be described by entries in tables. An example is shown in FIG. 9. FIG. 9 shows a network definition table 901 containing a plurality of entries. The table may be stored electronically as digital data on a machine-readable medium such as disk or processor memory, for example. Under the column heading "Network_Item," the network definition table 901 defines an Asset A (corresponding to Asset A of FIG. 8, for example) and an Asset B (corresponding to Asset B of FIG. 8, for example) and a network identifier 4711 (under the column heading "Network_ID"). Asset A and Asset B are related and are members of the same network (4711). Similarly, an Asset X and an Asset Y are related and are members of network 2222.

Figure 10:
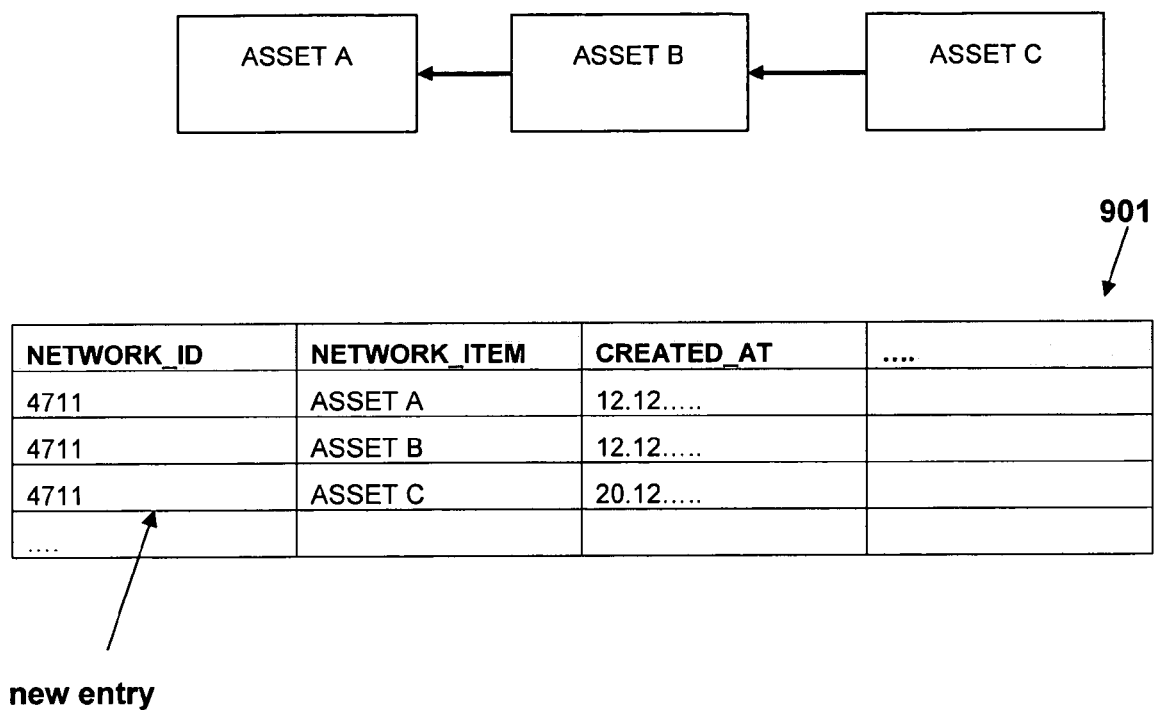
FIG. 10 shows an example of extending a digital asset relationship network according to embodiments of the present invention.
Figure 11:
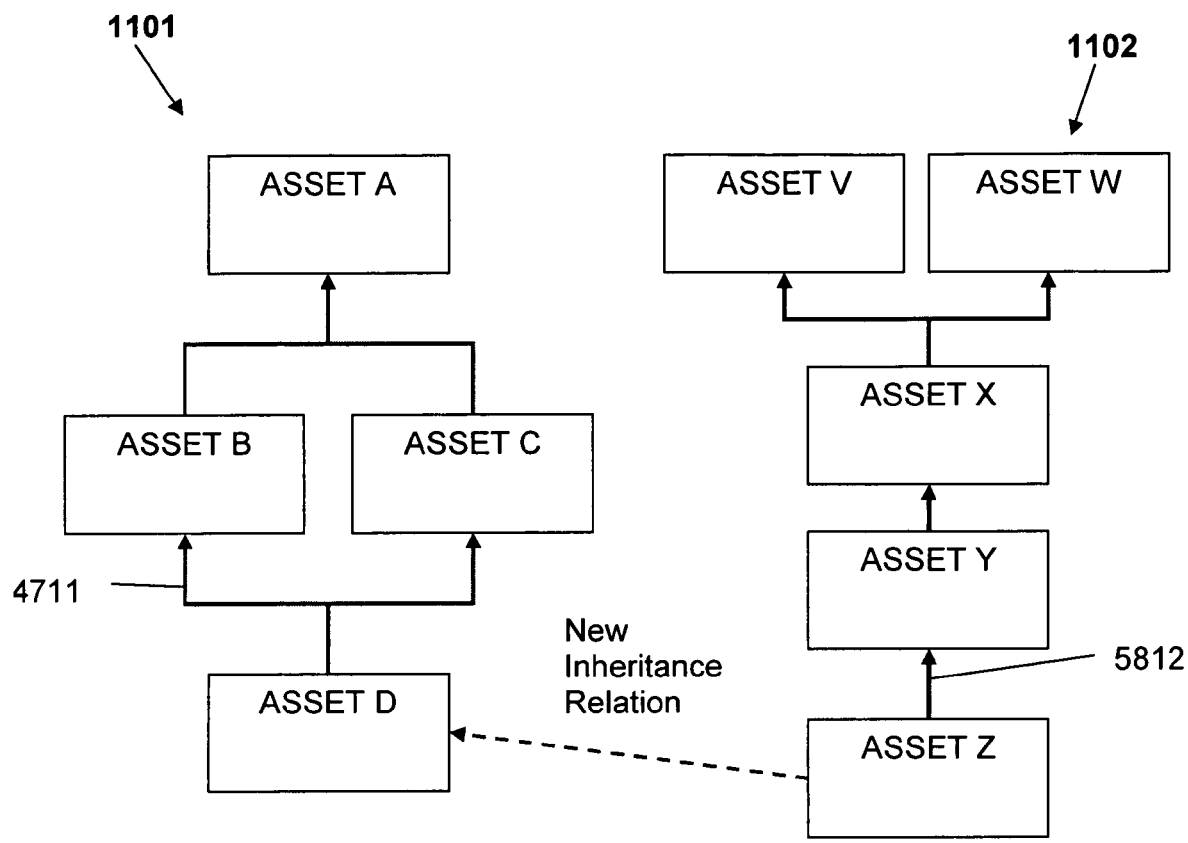

A network may be extendable by adding another linkage. For example, as shown FIG. 10, assume a new digital asset, Asset C, is created. A new linkage corresponding to Asset C is created in the network definition table 901, relating Asset C to Asset A and Asset B. Further, networks may be extended by fusing with other networks. Fusion of networks may involve the creation of a new network combining two or more previously existing networks. An example is shown in FIGS. 11 and 12. FIG. 11 shows two distinct relationship networks 1101 and 1102, with identifiers 4711 and 5812, respectively. A corresponding network definition table 1201 is shown in FIG. 12. Assume a user decides to form a new inheritance relationship between Asset D and Asset Z. The resulting network definition table 1202 is shown in FIG. 12, wherein a new network 8877 has been formed by fusion of previously existing networks 4711 and 5812.

Figure 13:
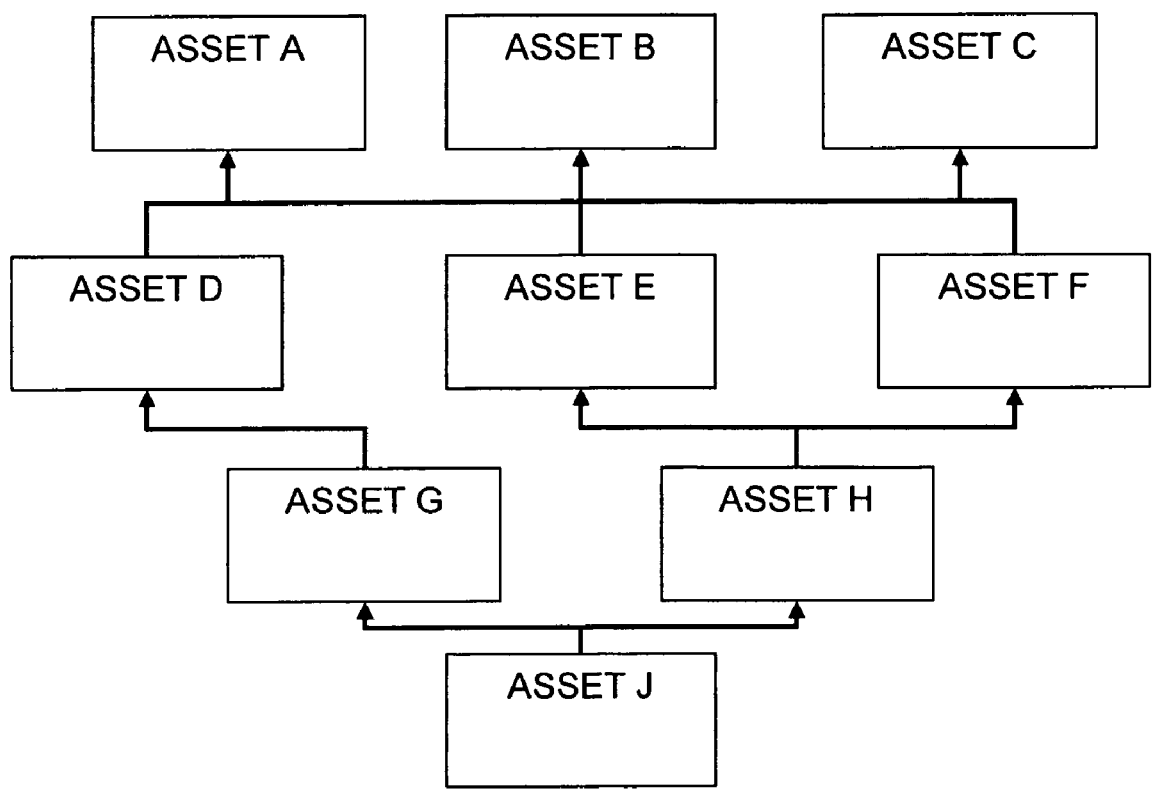
FIG. 13 shows another example of a digital asset relationship network according to embodiments of the present invention.

By referring to a network, it may be possible to automatically determine for a given digital asset all of its higher-level assets, i.e., all of the assets that it can inherit from. This is illustrated in FIG. 13. FIG. 13 shows a network comprising a plurality of digital assets having inheritance relationships. For example, digital asset D has digital assets A, B and C as higher-level assets. Digital asset G has digital assets A, B, C and D as higher-level assets, for example. Finally, digital asset J has all of the other digital assets in the network as higher-level assets, i.e., digital assets A, B, C, D, E, F, G and H. According to embodiments of the invention, inheritance information as in the foregoing example can be automatically obtained for any digital asset by referring to the network information. From the inheritance information and associated linkages, appropriate conditions can be provided for all related digital assets.

As noted earlier, embodiments of the present invention may comprise computer-executable instructions. The computer-executable instructions may be stored and transported on machine-readable media such as magnetic tape, floppy disk or CD-ROM. The computer instructions may be retrieved from the machine-readable media using a suitable reading device into a memory and executed by a processor. The computer-executable instructions may be distributed across a plurality of media, such as on physically separate storage devices respectively associated with physically separate computer systems that may communicate via a network. The functionality disclosed hereinabove for performing the embodiments may find specific implementations in a variety of forms, which are considered to be within the abilities of a programmer of ordinary skill in the art after having reviewed the specification.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A combined digital asset management system and Intellectual Property management system, comprising:
    a digital asset management system;
    an intellectual property management system; and
    an interface for the exchange of data between the systems, the interface including media for the propagation of electronic information;
    the digital asset management system to store data objects representing digital assets, the data objects storing content of multiple versions of the digital asset, further storing metadata identifying at most one of the versions that is valid for use by the digital asset management system, further storing automatically generated inheritance links based on object hierarchies, and further storing links between objects based on a taxonomy of properties associated with each object, separate from the inheritance links;
    the intellectual property system configured to receive input from a user defining legal rights associated with a particular digital asset and storing those rights in association with the particular digital asset; and further receiving input from a user defining a user created IP link between two digital assets including a hierarchical designation between the two digital assets, the IP link being separate from the automatically generated inheritance links, wherein a lower designated digital asset of a user created IP link inherits the legal rights definition associated with a higher designated digital asset of the user created IP link.

2. The system of claim 1, wherein the inheritance link is between a higher-level digital asset and a lower-level digital asset, the inheritance link to transfer a condition assigned to the higher-level digital asset to the lower-level digital asset.

3. The system of claim 1, wherein the legal rights definition relates to at least one of a right to use a digital asset and a restriction on a use of the digital asset.

4. The system of claim 3, wherein a digital asset is associated with a legal information document that states the at least one of a right and a restriction in text.

5. The system of claim 3, wherein the right applies for a specified time period defined by the restriction.

6. The system of claim 1, further comprising access control for the digital assets based on the associated legal rights.

7. The system of claim 1, wherein each version may indicate a time period for when that version is active.

8. A method for executing a combined digital asset management system and Intellectual Property management system, comprising:
    storing data objects representing digital assets, the data objects storing content of multiple versions of the digital asset;
    storing metadata identifying at most one of the versions that is valid for use;
    storing automatically generated inheritance links based on object hierarchies;

storing links between objects based on a taxonomy of properties associated with each object;

receiving input from a user defining legal rights associated with a particular digital asset;

storing those rights in association with the particular digital asset;

receiving input from a user defining a user created IP link between two digital assets including a hierarchical designation between the two digital assets, the IP link being separate from the automatically generated inheritance links associated with the two digital assets;

inheriting the legal rights definition of a higher designated digital asset of a user created IP link to a lower designated digital asset of the same user created IP link.

9. The method of claim 8, further comprising:

controlling access to digital assets based on associated legal rights.

10. The method of claim 9, wherein controlling access comprises preventing unauthorized viewing of the digital assets.

11. The method of claim 9, wherein controlling access comprises preventing unauthorized downloading of the digital assets.

12. The method of claim 9, wherein the associated legal rights relates to at least one of a right to use the digital assets and a restriction on a use of the digital assets.

13. A non-transitory machine-readable medium storing data structures, the data structures comprising:

a plurality digital asset data objects, each storing content of multiple versions of a digital asset, including metadata identifying at most one version that is valid for use;

automatically generated inheritance links based on object hierarchies;

separate taxonomy links based on properties associated with the objects;

definitions of legal rights associated with each object, provided by user input;

separate IP links, defined by user input, including a hierarchical designation between IP-linked digital assets, the IP links being separate from the hierarchical designation and automatically generated inheritance links associated with the digital assets;

inherited legal rights definitions, each received from a higher level digital asset of an associated IP link.

14. The non-transitory machine-readable medium of claim 13, wherein the IP link is an inheritance relationship between a higher-level digital asset and a lower-level digital asset, the inheritance relationship to transfer a condition assigned to the higher-level digital asset to the lower-level digital asset.

15. The non-transitory machine-readable medium of claim 14, wherein the conditions relate to at least one of a right to use a digital asset and a restriction on a use of the digital asset.

16. A non-transitory machine-readable medium storing computer-executable instructions to perform a method, comprising:

storing data objects representing digital assets, the data objects storing content of multiple versions of the digital asset;

storing metadata identifying at most one of the versions that is valid for use;

storing automatically generated inheritance links based on object hierarchies;

storing links between objects based on a taxonomy of properties associated with each object;

receiving input from a user defining legal rights associated with a particular digital asset;

storing those rights in association with the particular digital asset;

receiving input from a user defining a user created IP link between two digital assets including a hierarchical designation between the two digital assets, the IP link being separate from any other link associated with the two digital assets;

inheriting the legal rights definition of a higher designated digital asset of a user created IP link to a lower designated digital asset of the same user created IP link.

* * * * *